United States Patent [19]

Gaspari

[11] 4,021,103

[45] May 3, 1977

[54] OPHTHALMIC MOUNTING ARRANGEMENTS

[76] Inventor: Tiberio Gaspari, 165 Locust Ave., Rye, N.Y. 10580

[22] Filed: July 7, 1975

[21] Appl. No.: 593,652

[52] U.S. Cl. .............................. 351/126; 351/86; 351/106; 351/154
[51] Int. Cl.² ............................................... G02C 5/06
[58] Field of Search ............... 351/86, 95, 98, 126, 351/154, 41, 106

[56] References Cited

UNITED STATES PATENTS

| 2,914,986 | 12/1959 | Zakin | 351/154 X |
| 3,552,840 | 1/1971 | Braget | 351/154 |
| 3,829,201 | 8/1974 | Whiting | 351/154 |

FOREIGN PATENTS OR APPLICATIONS

| 854,226 | 1/1940 | France | 351/154 |
| 1,085,988 | 2/1902 | France | 351/41 |

*Primary Examiner*—Paul A. Sacher

[57] ABSTRACT

An improved ophthalmic mounting arrangement for a pair of removable eyeglass lenses is described. The outer periphery of a lens-receiving annular liner exhibits a U-shaped channel which interlockingly engages a flat peripheral edge of an associated lens mounting rim in a rigid, unitary bifurcated frame. The two mounting rims of the frame are unobstructedly connected through an open bridge area whose lower peripheral edge is resiliently deformable out of the plane of the frame to facilitate insertion and removal of the lenses.

8 Claims, 6 Drawing Figures

OPHTHALMIC MOUNTING ARRANGEMENTS

BACKGROUND OF THE INVENTION

The invention relates to ophthalmic mountings of the type useful in eyeglass assemblies, and in particular relates to assemblies of such type wherein a pair of lenses are removably receivable within lens mounting rims of the eyeglass frame.

In presently known opthalmic mounting arrangements, the mounting frame includes a pair of hollow lens mounting rims separated by a solid bridge area on which a nosepiece may be selectively mounted. Typically, one frame material in such designs is a flexible plastic, which permits each of the isolated mounting rims to "give" to facilitate insertion and removal of the replaceable lenses.

In an illustrative embodiment of this type disclosed in U.S. Pat. No. 1,659,165, each lens is carried in an annular rim or liner provided with a camming wedge on its exterior surface to cooperate with a mating recess in the receiving surface of the rame mounting rim.

Such prior art designs obviously rely on the necessity of natural elasticity of the mating interlocking parts, i.e., the annular lens liner and the peripheral edge of the frame mounting rim. Such natural elasticity is augmented, in the structure of the above-mentioned patent, by the cam pressure of a wedge. In such designs, therefore, it is necessary to make the frame out of flexible materials. Moreover, the use of machined projections and recesses on both the lens liner and the frame make the ophthalmic mounting difficult and expensive to manufacture.

SUMMARY OF THE INVENTION

The present invention provides an efficient and inexpensive ophthalmic mounting arrangement wherein replaceable lenses may be quickly and easily inserted into and removed from lens mounting rims of an eyeglass frame, which frame need not be formed from flexible material as in the prior art.

In an illustrative embodiment, the frame is formed as a rigid, unitary bifurcated structure in which the hollow lens mounting rims are interconnected by a reduced-size, hollow bridge area which effects communication in an unobstructed manner between the interiors of the lens mounting rims. In order to provide the required "give" of the mounting rims to effect insertion and removal of the lenses, the lower peripheral edge of the open bridge area between such mounting rims is adapted to be resiliently deformable out of the plane of the frame without deleteriously effecting the overall rigidity of the frame; this may be accomplished, e.g. by defining the lower peripheral edge of the bridge area by upward extensions of the respective lower peripheral edges of the mounting rims.

Preferably, the peripheral, lens-receiving edge of each mounting rim of the frame is of flat construction, and lockingly interengages with the edges of a U-shaped channel defined in the outer surface of the lens liner. In one construcion, the liner and a lens permanently affixed thereto is received in the frame rim as a unit. Alternatively, in the case where the lens is separable from the liner, the liner alone is first secured to the frame mounting rim, after which the separate lens is interlockingly received in a mating groove in the frame-supported liner.

BRIEF DESCRIPTION OF THE DRAWING

The invention is further set forth in the following detailed description taken in conjunction with the appended drawing, in which:

FIG. 6 is a fragmentary view of an alternative embodiment of ophthalmic mounting in accordance with the invention, in which a lens liner removable from the lens proper is initially secured to a flat peripheral edge of the eyeglass frame.

DETAILED DESCRIPTION

Figure 1:
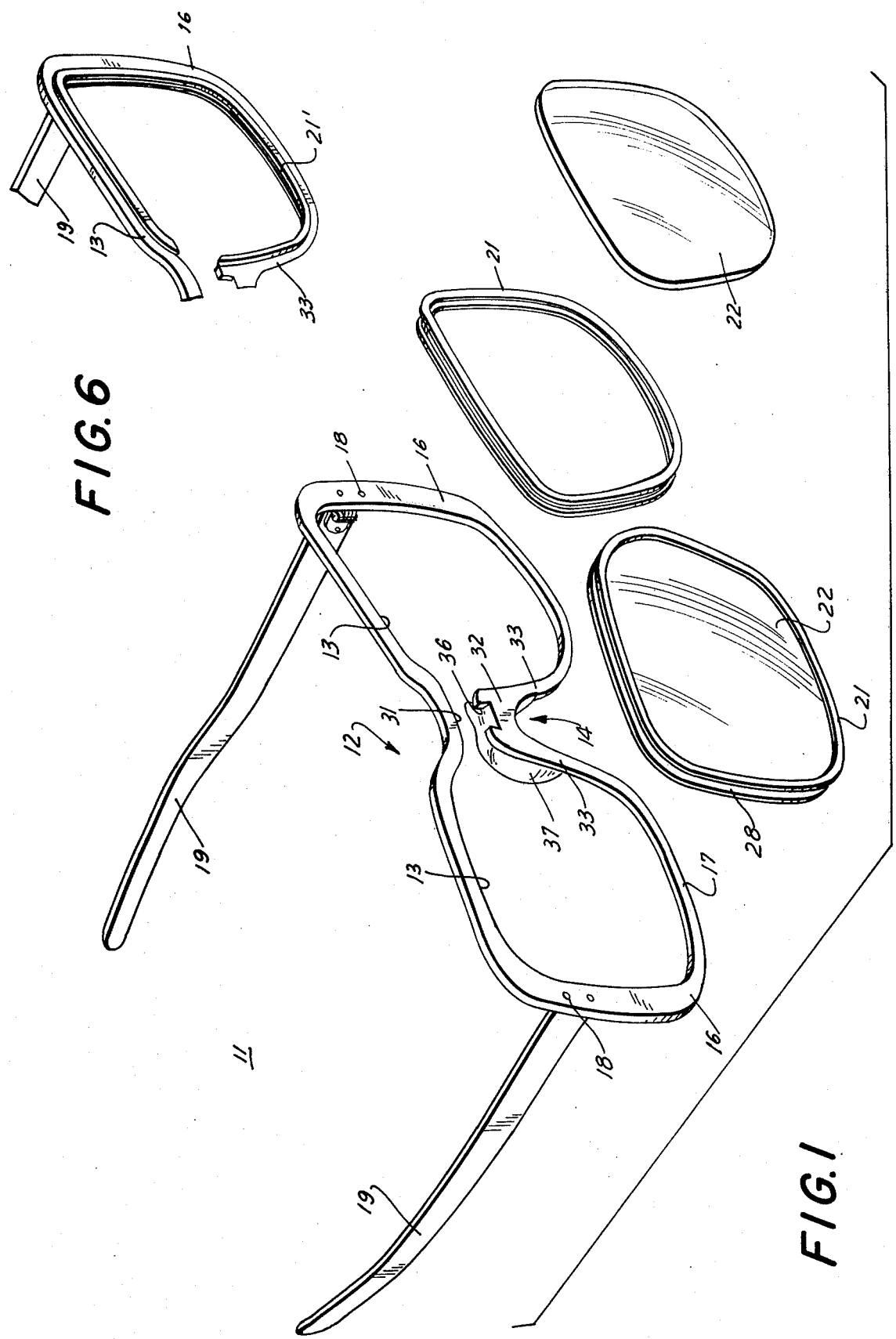
FIG. 1 is an exploded view, in perspective, of an eyeglass structure having one form of improved ophthalmic mounting arrangement for replaceable lenses in accordance with the invention.
Figure 2:
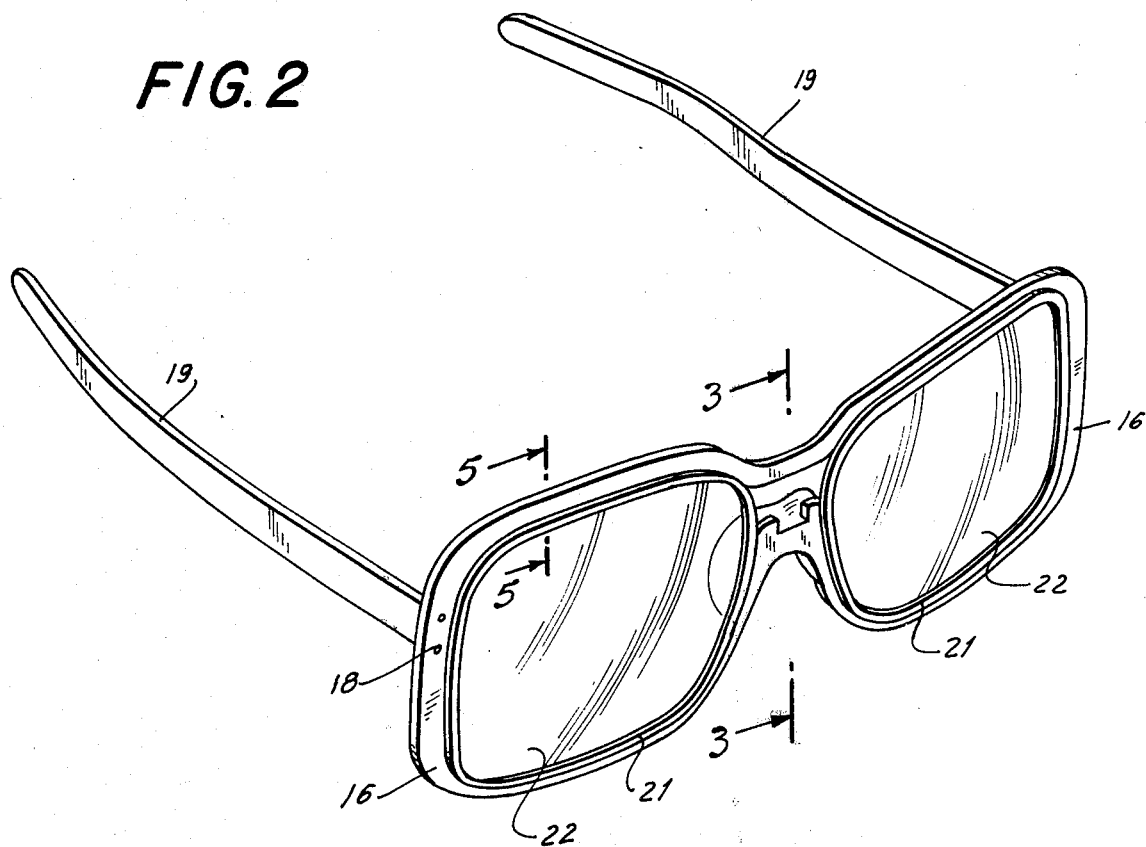
FIG. 2 is a perspective view of the eyeglass arrangement of FIG. 1 in a fully assembled state.

Referring now to the drawing, and particularly to FIGS. 1 and 2, an eyeglass assembly 11 in accordance with the invention includes a unitary frame 12, which is illustratively formed from metal or a rigid plastic such as polystyrene. The frame 12 defines a surface which has a relatively large radius of curvature, and in the extreme may be planar; and for simplicity, such surface will be referred to in the remainder of the description as a plane.

The frame 12 is illustratively a bifurcated structure wherein a pair of hollow, symmetrical lens mounting rims 13, 13 are interconnected by a constricted bridge area 14 which is described in more detail below. Each of the mounting rims 13 has a peripheral edge 16 whose inner boundary surface 17 is illustratively flat. The outermost or temple portions of the peripheral edges 16 of both rims 13 are provided with screw mounting holes 18, 18 to facilitate assembly of the frame 12 to temple bows 19, 19 in a conventional manner.

Figure 5:
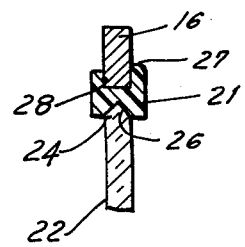
FIG. 5 is a sectional view taken along line 5—5 of FIG. 2, illustrating the manner of engagement of the lens in the inner periphery of the annular liner.

Each of the mounting rims 13 of the frame 12 is adapted to interlockingly receive an annular lens-receiving liner of the type represented at 21, to the inner surface of which a conventional lens 22 is secured. The lens 22 may be of glass or plastic. The liner 21 may be secured to the encompassed lens in any conventional manner. In one mode of construction shown in FIG. 5, the outer surface of the lens 22 terminates in a wedge 24 which is received within a V-shaped groove 26 in the liner 21. The liner, like the frame 12, may be made of metal or a rigid plastic, or alternatively may be made of a flexible plastic such as polyvinyl chloride or polyethylene. Again, the fabrication of the liner 21 and its assembly to the surrounded lens 22 is conventional and will not be discussed further here.

The outer surface (designated 27) of the annular liner 21 is provided with a U-shaped channel 28 for lockingly interengaging with the flat inner surface 17 on the peripheral edge 16 of the frame 12. As indicated best in FIG. 5, in the assembled position the front and rear sides of the channel 28 straddle the walls of the peripheral edge 16. If desired, the rear side of the channel 28 may be locally removed in the region of the bridge area 14 to facilitate the assembly of the liner 21 and the flat rim 13.

With this arrangement, a sure and stable interlock of the received lens unit 21 and the lens mounting rim 13 is accomplished without the necessity of machining grooves or other lens-supporting facilities on the frame mounting rim 13.

If desired, the lens 22 may be removably, rather than permanently, attachable to the liner 21. In such case, the channel 28 of the annular liner can be initially interlocked with and secured to the flat rim 13 of the frame before the lens is assembled thereto, as shown in FIG. 6. In this latter case, it is desirable that the liner (designated 21')be open as shown in the region of the bridge to facilitate insertion of the lens therein.

In further accordance with the invention, the insertion and removal of the lens liners in the mating lens mounting rims 13 is accomplished, notwithstanding the rigid nature of the material of the frame 12, by the construction of the bridge area 14 now to be described. In particular, the bridge area 14 defines a hollow cavity 31 (FIG. 1) of reduced area to provide unobstructed communication between the hollow interiors of the lens mounting rims 13, 13. A lowe peripheral edge 32 of the bridge area 14 is defined by upward extensions 33, 33 of the peripheral edge 16 on the rims 13. With such construction, the lower peripheral edge 32 of the bridge area 14 is resiliently deformable, usually by no more than finger pressure, out of the plane of the frame 12, thereby providing the required "give" in the area of the rims 13, 13 to facilitate the required insertion and removal of the individual lens liners 21.

Figure 4:
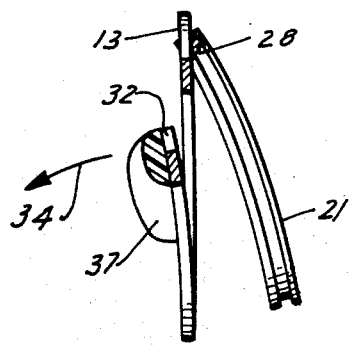
FIG. 4 is a sectional view, similar to FIG. 3, but illustrating the manner of deformation of the lower peripheral edge of the bridge area of the frame during the insertion of the lens liner.
Figure 3:
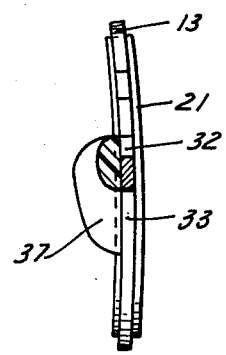
FIG. 3 is a sectonal view taken along line 3—3 of FIG. 2, illustrating the interengagement of a lens-bearing liner and the mounting rim of the frame in the fully assembled position.

The manner of deformation of the bridge area 14 for this purpose is best shown in connection with FIGS. 3 and 4. in FIG. 3, for example, the bridge area 14 is shown in its normal position coplanar with the remainder of the frame 12, in which position a lens liner 21 is shown rigidly held in interlocking relation with the associated mounting rim 13. In order to position the lens unit in such a manner, the bridge area 14 is initially deformed inwardly and downwardly as shown by arrow 34 in FIG. 4 to temporarily englarge the interior of the rims 13. During such deformation, the channel 28 of lens liner 21 can be fitted on and slid along the mating flat surface of the frame 12 in an outward direction until the lens liner rests securely against the outermost or temple portion of the peripheral edge 18. At this point, the finger pressure on the bridge area can be released permitting the rim interior to resume its normal size to complete the interlock of the frame and the included lens liner.

In the event that the liner 21 has been preassembled onto the frame rim 13 in the manner shown in FIG. 6, the above-mentioned deformation of the bridge area by finger pressure will serve to enlarge both the frame and the liner, so that the frame-liner assembly can easily and conveniently receive the associated separate lens 22.

The lower peripheral edge 32 (FIG. 1) of the bridge area 14 may preferably be provided as shown with a channel 36 for receiving and seatng a conventional nosepiece 37.

It will be appreciated that the one-piece unitary rigid frame contemplated by the instant invention, together with the improved construction and manner of interengagement of the flat peripheral edge of the mounting rim with the lens liner, can lead to significantly reduced costs and increased efficiency for mass production. Additonally, the lenses can be quickly, simply and securely replaced by the wearer without the necessity of any tools.

In the foregoing, some illustrative embodiments of the invention have been described. Many variations and modifications will now occur to those skilled in the art. It is accordingly desired that the scope of the appended claims not be limited to the specific disclosure herein contained.

What is claimed is:

1. In an eyeglass assembly, a unitary bifurcated frame defining a main surface having a relatively large radius of curvature, said frame including a pair of hollow, peripherally flat lens mounting rims of relatively large height interconnected by a hollow bridge area of relatively small height, whereby communication between the interiors of the lens mounting rims is effected unobstructedly through the interior of the bridge area, the lower peripheral edge of the bridge area being resiliently deformable out of the main surface of the frame, and a pair of lens liners individually interlockable with the flat peripheral edges of the lens mounting rims.

2. In an ophthalmic mounting arrangement for a pair of removable lenses, a unitary bifurcated frame of rigid material defining a main surface having a relatively large radius of curvature, said frame having a pair of hollow lens mounting rims of relatively large height for receiving said lenses and interconnected by a hollow bridge area of relatively small height whereby communication between the interiors of the lens mounting rims is effected unobstructedly through the interior of the bridge area, the lower peripheral edge of the bridge area being resiliently deformable out of the main surface of the frame to facilitate insertion and removal of the individual lenses.

3. An arrangement as defined in claim 2, in which the lower peripheral edge of the bridge area is defined by upward extensions of the respective lower peripheral edges of the lens mounting rims.

4. An arrangement as defined in claim 2, in which the frame material is metal.

5. An arrangement as defined in claim 2, in which the frame material is rigid plastic.

6. An arangement as defined in claim 2, in which the lower peripheral edge of the bridge area has a channel therein for removably receiving an external nosepiece.

7. An arrangement as defined in claim 2, in which the peripheral edges of the lens mounting rims are substantially flat.

8. An arangement as defined in claim 7, further comprising a separate annular liner having an outer surface interlockable with the flat peripheral edge of the lens mounting rim, the inner surface of the liner exhibiting a lens-receving groove.

* * * * *